June 16, 1936. H. M. RYAN ET AL 2,044,546

FAULT INDICATOR AND RECTIFIER FOR ELECTRICAL CIRCUITS OF MOTOR VEHICLES

Filed July 17, 1934

Inventors
Harry Michael Ryan and
Kenneth Gregory Ryan
By B. Singer, atty.

Patented June 16, 1936

2,044,546

UNITED STATES PATENT OFFICE 2,044,546

FAULT INDICATOR AND RECTIFIER FOR ELECTRICAL CIRCUITS OF MOTOR VEHICLES

Harry Michael Ryan and Kenneth Gregory Ryan, South Strathfield, New South Wales, Australia Application July 17, 1934, Serial No. 735,666
In Australia July 17, 1933

5 Claims. (Cl. 175—183)

The general object of this invention is to provide simple and convenient means for the testing of the individual leads in the circuits of the electric system of a motor vehicle, and for providing a temporary substitute lead for any lead which is proved to be faulty, by the mere turn of a switch. If it is found that current is not reaching a particular electrical device, it is evident that a fault exists in the electrical connections, provided of course that the source of supply is known to be in order. The precise object of the invention is to enable a determination to be made as to the particular section which is faulty, and to enable a temporary connection to be made from the source of supply.

The invention possibly may be applied to other uses where electrical circuits are employed, such as power house installations, aeroplanes and the like. The term "motor vehicle" as used throughout this specification is intended to comprehend such other suitable applications.

It has been proposed previously to employ a device for testing the leads to the electrical apparatus of a motor vehicle, but the present invention goes considerably further in that it provides means for substituting a lead to the apparatus, by the mere turn of a switch, should the main lead be faulty. This feature is particularly useful as the replacement of a faulty lead takes considerable time, and as the faults often make their presence felt at most inconvenient times.

Figure 1:
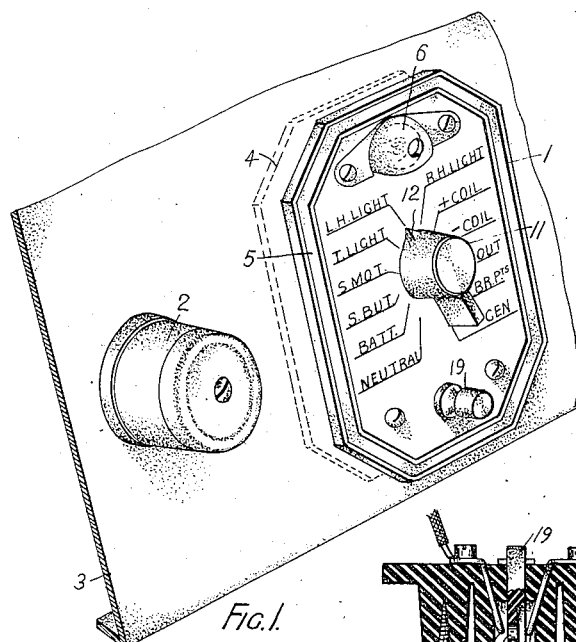
Figure 2:
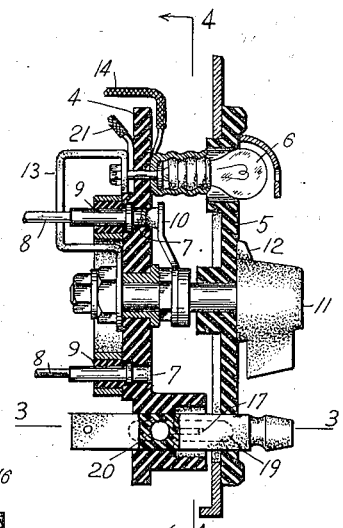
Figure 3:
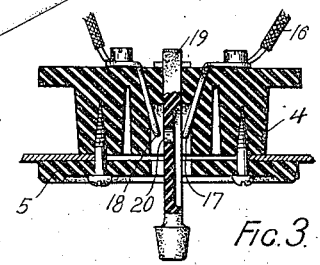
Figure 4:
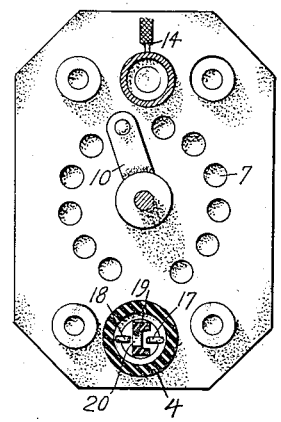
Figure 5:
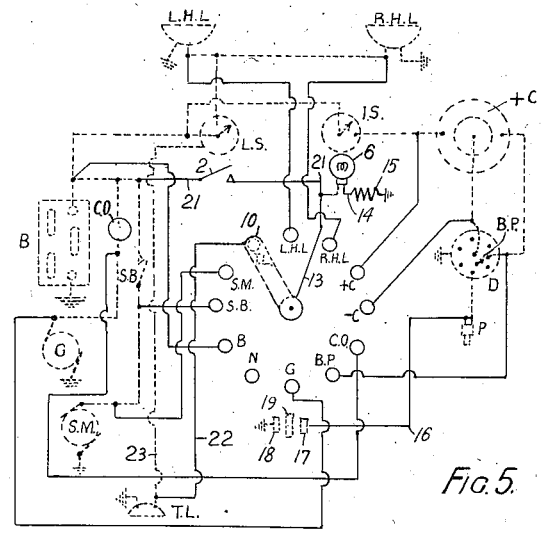

In order to fully describe the invention reference is made to the accompanying drawing, which depicts one simple embodiment thereof, and in which Figure 1 is a perspective view of the device as installed on the dashboard of a motor vehicle, Figure 2 a central cross-sectional view through the major portion thereof, Figure 3 a cross-sectional plan on line 3, 3 of Figure 2, Figure 4 a cross-sectional view on line 4, 4 of Figure 3, and Figure 5 is a simple wiring diagram showing the operation of the device by way of example only.

As shown in Figure 1 the device includes a main switch designated generally by the numeral 1, and an emergency switch 2 of suitable type, both mounted on the dashboard 3 or other convenient part of the vehicle.

The main switch 1 is mainly of insulating material and comprises a back plate 4 and a front plate 5 spaced therefrom, and an indicating lamp 6 suitably installed therein to be visible on the front of the switch. The back plate 4 is provided with a plurality of circularly disposed fixed contacts 7, 7 to which leads 8, 8 are taken respectively and are insulated as at 9. A wiper contact arm 10 is pivotally mounted in the switch and is adapted to be moved into contact with any of the contacts 7 which may be selected. The wiper arm 10 is moved by a finger knob 11 on the front of the switch, a pointer 12 on which indicates the particular part of the electrical circuit to which the wiper is in that position connected through one of the contacts 7 and leads 8. The various parts of the system are shown, by way of example, in Figure 1 on the face of the switch 1 and are battery, starter button, and so on.

A lead 13 permanently connects the wiper 10 to one terminal of lamp 6, the other terminal of which is connected by a lead 14, through a resistance 15 (Figure 5), to earth.

A high tension plug lead testing device is shown in Figures 2 and 3, and comprises a high-tension lead 16 from plug P (Figure 5) to a spark gap terminal 17. A second spark gap terminal 18 is spaced from the former terminal and between the two there is a separator 19 slidably mounted in the switch, and provided with an aperture 20 therethrough. When in the "off" position (Figure 2) the separator 19 prevents a spark across terminals 17 and 18, but when in the "on" position (Figure 3) the spark can cross the terminals through the aperture 20, thus testing whether high-tension current is being supplied to the plug P.

A connection from the battery is made by lead 21, through emergency switch 2, to lead 13 and hence to wiper arm 10.

Reference is now made to Figure 5, which depicts a simple wiring diagram of a motor vehicle (in dotted lines) with the device applied to the testing and fault rectification of the more important electrical leads, the additional leads necessitated by the device being shown in full lines. The following designations are used for the various integers of the electrical system, and for the contacts 7, 7 to which their leads are respectively connected:

| | | | |
|---|---|---|---|
| Left headlight | LHL | Right headlight | RHL |
| Tail-light | TL | Starter motor | SM |
| Starter button | SB | Battery | B |
| Generator | G | Breaker points | BP |
| Cut out | CO | Distributor lead | C |
| Primary coil | +C | | |

The neutral (or "off") position of the wiper 10 is indicated by N, the light switch by LS, and the ignition switch by IS.

A lead is taken from the lead-in terminal of each unit to the appropriate contact 7 of the switch. Thus for example, a lead 22 is taken from the socket of the normal lead 23 of the tail-light TL to the contact TL on the switch.

In the case of a failure, in order to test whether the circuit is correct as far as the unit is, it is only necessary to turn the switch 1 to the contact connecting to that unit, and if the lead to the unit is in order and the normal supply switch (LS or IS) is on, a circuit will be established through the lead under test, the wiper 10 and the lamp 6 to earth, the glowing of the lamp indicating that the supply of electricity is present and that the lead is sound. In the position of the wiper in Figure 5 the lead 23 to the tail-light TL is shown under test.

If the lamp 6 does not glow it is evident that the lead to the unit (for example the lead 23) or the wiring between this lead and the battery is faulty. It is possible, by means of this invention, to immediately provide a substitute lead to temporarily replace the defective lead. In the instance given, if the lead 23 has proven faulty and no electrical supply is reaching the tail-light TL, the wiper 10 is left in position TL as shown, and emergency switch 2 is closed, thus completing an emergency circuit from the battery B through lead 21, switch 2, wiper 10, contact TL and lead 22 to the tail-light, thus providing the necessary electrical supply to carry on until the faulty lead is rectified.

Similarly, other units may be supplied with electric power by use of the emergency switch 2 and appropriate positioning of the wiper 10. Of course, a high tension unit, such as the distributor, could not be supplied with high tension current.

If it is contemplated that emergency supply may have to be made to the starter motor, the leads and switches concerned would have to be of appropriately robust construction to carry heavy current.

The spark plug lead tester has been previously described, and is particularly useful in cases of engines which are inclined to oil plugs.

It is to be noted that the fault rectifying section of the device may be employed, if desired, without the employment of the indicating lamp. Indicating means other than an electric lamp may be employed.

The invention provides a neat and convenient means for immediately testing the wiring of any parts of the electrical system to which it may be applied, and provides for the immediate provision of low tension electrical supply in the event of failure of any one lead.

We claim:

1. A fault indicator and rectifier for use in conjunction with the electrical circuits of a motor vehicle, comprising a plurality of fixed contacts and means for directly connecting these contacts to points in the electrical circuit, a movable contact adapted to be engaged selectively with any of the said fixed contacts, an earth connection from said movable contact through indicating means including resistance, and a lead, incorporating a switch, to connect the said movable contact to a source of electric supply.

2. A fault indicator and rectifier for use in conjunction with the electrical circuits of a motor vehicle, comprising a plurality of separate fixed contacts to be permanently connected respectively by auxiliary wiring to separate parts of the electrical circuits, a common movable contact adapted to be engaged selectively to any of said fixed contacts, an earth connection from said movable contact through electrical indicating means including resistance, and a switch and a connection between said movable contact and a source of electrical energy.

3. A fault indicator and rectifier according to claim 1, in which the indicating means comprises an electric lamp connected to the movable contact and to earth through a resistance.

4. A device according to claim 1, in which the fixed contacts are mounted in circular disposition in a base plate, and the movable contact is in the form of a rotatable wiper arm adapted to be rotated to contact with any of said fixed contacts selectively.

5. A device according to claim 1, in which the fixed contacts are mounted in circular disposition in a base plate, and the movable contact is in the form of a rotatable wiper arm adapted to contact with any of said fixed contacts selectively, and including an indicator finger coupled to said wiper arm and movable over a calibrated dial.

HARRY MICHAEL RYAN.
KENNETH GREGORY RYAN.